Nov. 23, 1943.  R F. HLAVATY  2,334,768

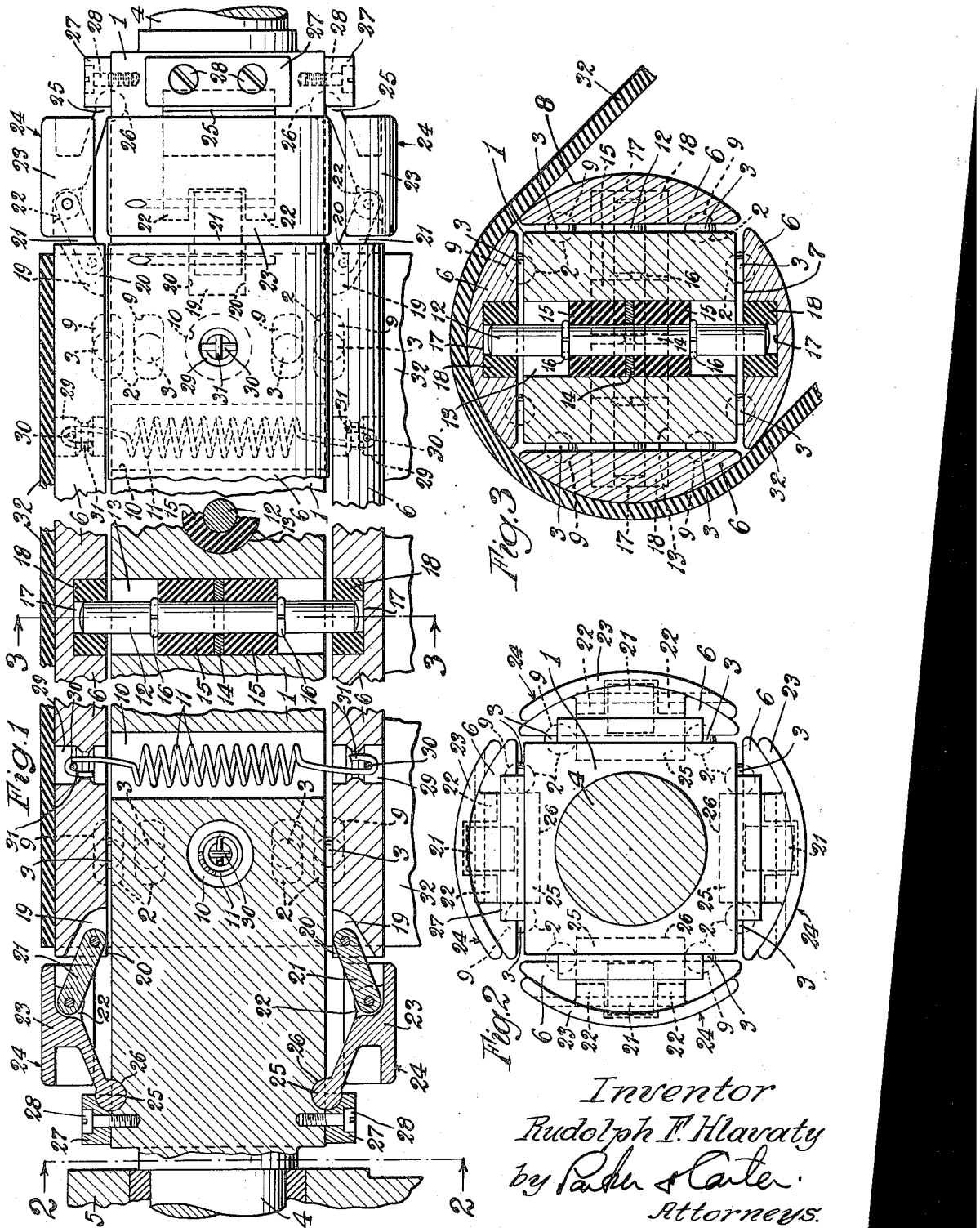

SELF-ALIGNING PULLY

Original Filed Nov. 7, 1941  2 Sheets-Sheet 2

Inventor
Rudolph F. Hlavaty
by Parker Carter.
Attorneys

Patented Nov. 23, 1943

2,334,768

UNITED STATES PATENT OFFICE 2,334,768

SELF-ALIGNING PULLEY

Rudolph F. Hlavaty, Cicero, Ill.

Original application November 7, 1941, Serial No. 418,208. Divided and this application July 15, 1942, Serial No. 451,002

19 Claims. (Cl. 74—241)

This invention relates to a self-aligning means, and while it is shown herewith as applied to a self-aligning pulley, it is not limited to that use, and may be applied to any rotary member which it is desirable to supply with self-aligning means. In a broad sense, therefore, it comprises a self-aligning, generally cylindrical member. It may be applied to a pulley which is associated with a belt of any type, and it has, therefore, for one object, to provide self-aligning means for a rotary member.

Another object is to provide automatic self-aligning means for a roller, which may be associated with a belt, a line, a chain, an apron, a screen, or any other member which runs in contact with the rotary member.

Another object is to provide a self-aligning pulley associated with a conveying belt or apron, and it may be embodied in a pulley which is driven or is a driver or is merely an idler.

Another object is to provide in connection with a rotary member surface parts which are self-aligning in response to the movement of some other part associated with the rotary member, when the former part gets into misalignment with the main rotary member.

Other objects will appear from time to time throughout the specification and claims.

This invention is illustrated more or less diagrammatically in the accompanying drawings, wherein:

Figure 1 is a longitudinal section with parts in elevation and parts broken away, showing a self-aligning rotary member made in accordance with the present invention, and associated with a belt, with the parts in the proper position of alignment.

Figure 2 is a sectional view taken at line 2—2 of Figure 1, with parts in elevation.

Figure 3 is a transverse sectional view taken at line 3—3 of Figure 1.

Like parts are indicated by like characters throughout the specification and the drawings.

Figure 4:
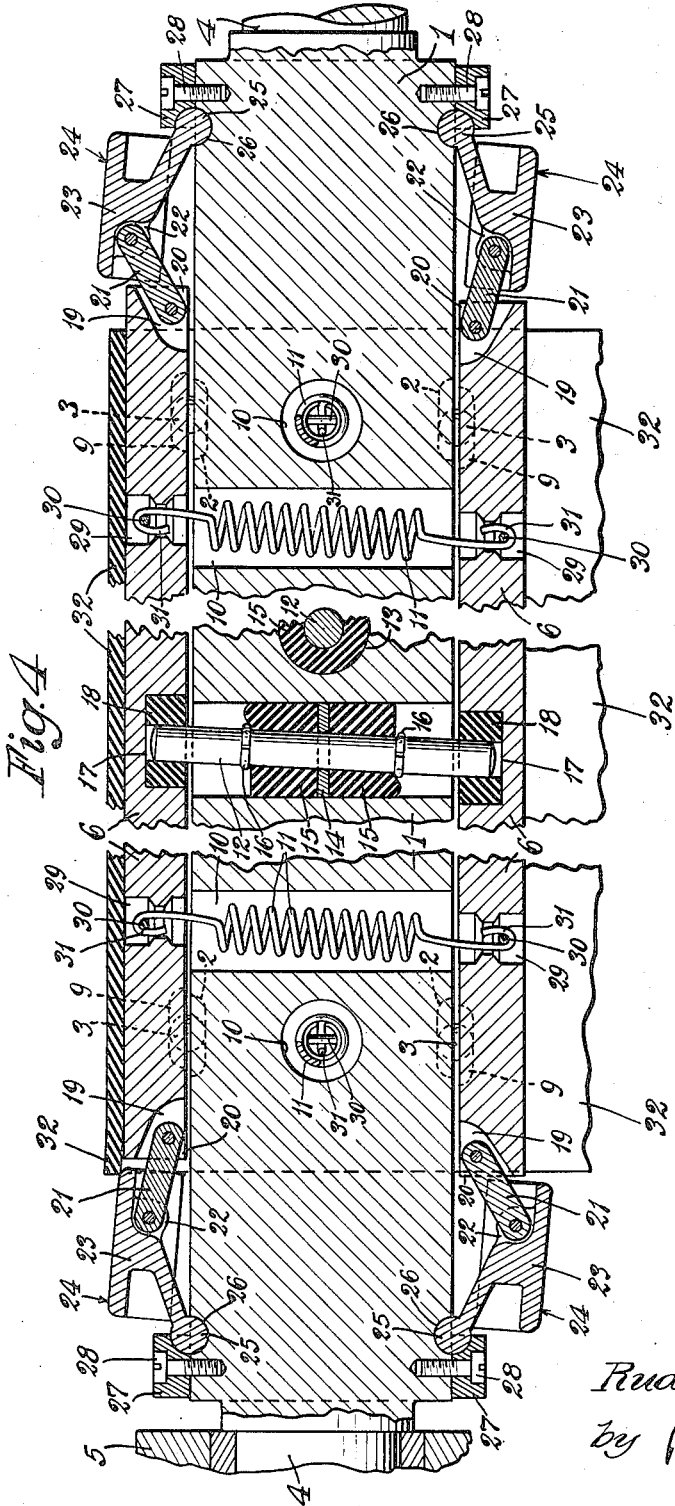
Figure 4 is a longitudinal section generally similar to Figure 1, but showing the parts in the position which they assume when the belt has moved out of alignment.

In the form shown herewith, the rotary member comprises generally a main body section 1, which may be squared to provide four flat faces, and each face is provided with a plurality of ball races 2, in which balls 3 are positioned. At each end the member 1 is reduced to form the portions 4, which are received in bearings 5.

Upon each face of the member 1 is positioned a surface member 6, which has a generally flat inner face 7 and an arcuate outer face 8. The inner face 7 is provided with a plurality of ball races 9, whose number and position correspond to those of the ball races 2.

As a means for fastening the surface members in place, the body 1 is provided with perforations 10, through which springs 11 extend. These springs are fastened at each end to one of the surface members. Preferably there are two perforations for each pair of surface members and two springs joining each pair of such members. As a means for transmitting movement from one surface member to the other member of the pair, a pin or rod 12 is provided for each pair of surface members, and these pins are positioned within additional preforations 13 formed in the body of the member 1. A washer 14 is positioned adjacent the middle of each pin and is secured in place in the perforation 13. It serves as a bearing. Positioned on each side of the washer 14 may be members 15, formed of rubber or similar material. They are to some degree confined and held in place by rings 16. At each end each pin 12 extends into one of the surface members 6, and each surface member is provided with a pocket or depression 17, which may be lined with a member 18 of rubber or analogous material, and thus the pins are cushioned at their centers and at their ends.

At its end each surface member 6 is cut away as at 19 to provide a pair of projections 20, and between each pair of projections 20 there is journaled links 21. These links at their opposite ends are journaled on a tongue or projection 22 which is formed on a member 23. The upper face of each member 23 comprises an arcuate portion 24. Extending from each member 23 is a bearing portion 25 which is mounted in a groove or notch 26 and formed in an adjacent part of the member 1, and it is held in place by a keeper 27, which is itself secured by means of a screw 28.

The springs 11 may be secured to the surface members 6 in any desired manner. As shown, the surface members are perforated as at 29 and in each perforation a pin 30 is positioned. Each end of the spring is bent into a hook 31, and each hook 31 engages one of the pins 30. In this manner, the springs are readily positioned, and secured to the surface members, and when desired, may be readily removed from them.

The ball races 2 and 9 are relatively flat. Although their ends may be curved, each of these ball races is flat, so that there is no wedging action of the ball in the race, and pressure upon the surface member and against the balls does not of itself initiate or continue lateral movement of the surface member.

While the self-aligning rotor of this invention may be applied to many uses, it is shown herewith as engaging a belt 32.

This application is a division of my co-pending application Serial No. 418,208, filed November 7, 1941.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

The use and operation of the invention are as follows:

A plurality of members 23, which may be called wedge blocks, is used. They are arcuate in shape, as shown in Figure 2. The parts are shown properly aligned in Figure 1 and misaligned in Figure 4. As there shown, the belt has moved to the left and has ridden up on one of the blocks 23, forcing it downward. This, by means of the link 21, to some degree, has moved the upper surface member 6, which is under the full belt compression, to the right, as shown in that figure. A reverse movement has been transmitted, by the rod or rods 12, to the lower surface member 6, which is not, at that moment, under belt compression. The member 12 is substantially rigid and has a bearing in the ring or disc 14, and when its upper end is carried to the right, its lower end moves correspondingly to the left, and therefore the misalignment of the upper member 6 has caused an opposite movement of the lower member 6, which, when it comes into contact with the belt, will be in a position somewhat to the left of the neutral or properly aligned position, and it will resume its proper position as soon as the belt no longer contacts or rides up upon any of the blocks 23.

I claim:

1. In a self-aligning pulley, a pulley body, means for supporting it for rotation, and a plurality of pulley engaging elements moveably mounted on said body and adapted to be interposed between said body and a belt passing thereabout, said moveable elements being longitudinally moveable along said pulley body, and means, moveable with said body, for giving said pulley engaging elements longitudinal movement, said means including parts tiltably mounted on said body and moveably connected to said pulley engaging elements.

2. In a self-aligning pulley, a pulley body, means for supporting it for rotation, and a plurality of pulley engaging elements moveably mounted on said body and adapted to be interposed between said body and a belt passing thereabout, said moveable elements being longitudinally moveable along said pulley body in response to belt misalignment, and means, moveable with said body, for giving said pulley engaging elements longitudinal movement, said means including parts tiltably mounted on said body and moveably connected to said pulley engaging elements.

3. In a self-aligning pulley, a pulley body, means for supporting it for rotation, and a plurality of pulley engaging elements moveably mounted on said body and adapted to be interposed between said body and a belt passing thereabout, said moveable elements being longitudinally moveable along said pulley body, said means including parts tiltably mounted on said body and moveably connected to said pulley engaging elements, said pulley being mounted for rotation about a normally fixed axis, and members positioned on said pulley for moving said pulley-engaging elements, said last-mentioned members being movable in response to misalignment of the belt.

4. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, said means including parts tiltably mounted on said body and moveably connected to said pulley-engaging elements, and pressure-responsive means for moving a pulley-engaging element into a proper alignment with respect to the pulley body when said pulley-engaging element is subject to pressure from the belt.

5. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, and means moveable with said body, for giving said pulley-engaging elements longitudinal movement, and a driving member connecting oppositely placed pulley-engaging elements.

6. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body in response to belt misalignment, and means moveable with said body, for giving said pulley-engaging elements longitudinal movement, and a driving member connecting oppositely-placed pulley-engaging elements.

7. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, said pulley being mounted for rotation about a normally fixed axis, and members positioned on said pulley for moving said pulley-engaging elements, said last-mentioned members being moveable in response to misalignment of the belt, and a rigid member connecting oppositely placed pulley-engaging elements.

8. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, and pressure-responsive means for moving a pulley-engaging element into a proper alignment with respect to the pulley body when said pulley engaging element is subject to pressure from the belt, and a rigid member connecting oppositely placed pulley-engaging elements.

9. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, and means moveable with said body, for giving said pulley-engaging elements longitudinal movement, and a rigid member connecting oppositely placed pulley-engaging elements, and cushion means engaging the ends of said rigid members in oppositely positioned pulley-engaging elements, and cushion means interposed between said rigid members and said pulley body at a point intermediate the ends of said rigid members.

10. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body in response to belt misalignment, and means moveable with said body, for giving said pulley engaging elements longitudinal movement, and a rigid member connecting oppositely placed pulley-engaging elements, and cushion means engaging the ends of said rigid members in oppositely positioned pulley engaging elements and cushion means interposed between said rigid members and said pulley body at a point intermediate the ends of said rigid members.

11. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, said pulley being mounted for rotation about a normally fixed axis, and members positioned on said pulley for moving said pulley-engaging elements, said last-mentioned members being moveable in response to misalignment of the belt, and a rigid member connecting oppositely placed pulley engaging elements, and cushion means engaging the ends of said rigid members in oppositely positioned pulley engaging elements, and cushion means interposed between said rigid members and said pulley body at a point intermediate the ends of said rigid members.

12. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, and pressure-responsive means for moving a pulley-engaging element into a proper alignment with respect to the pulley body when said pulley-engaging element is subject to pressure from the belt, and a rigid member connecting oppositely placed pulley-engaging elements, and cushion means engaging the ends of said rigid members in oppositely positioned pulley-engaging elements, and cushion means interposed between said rigid members and said pulley body at a point intermediate the ends of said rigid members.

13. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, and means moveable with said body, for giving said pulley-engaging elements longitudinal movement, said last-mentioned means comprising wedge members pivotally supported on said body, and links joining said wedges with said pulley-engaging elements.

14. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, and means moveable with said body, for giving said pulley-engaging elements longitudinal movement, and a driving member connecting oppositely placed pulley-engaging elements, causing them, when moved, to move in opposite direction.

15. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body in response to belt misalignment, and means moveable with said body, for giving said pulley-engaging elements longitudinal movement, and a driving member connecting oppositely placed pulley-engaging elements, causing them, when moved, to move in opposite direction.

16. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, said pulley being mounted for rotation about a normally fixed axis, and members positioned on said pulley for moving said pulley-engaging elements, said last-mentioned members being moveable in response to misalignment of the belt, and a rigid member connecting oppositely placed pulley-engaging elements.

17. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, and pressure-responsive means for moving a pulley-engaging element into a proper alignment with respect to the pulley body when said pulley-engaging element is subject to pressure from the belt, and a rigid member connecting oppositely placed pulley-engaging elements.

18. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, and means moveable with said body, for giving said pulley-engaging elements longitudinal movement, said last-mentioned means comprising wedge members pivotally supported on said body, and links joining said wedges with said pulley engaging elements, said wedge members provided with surface portions adapted to lie outwardly beyond the upper surface of said pulley-engaging members when the pulley is in proper condition of alignment.

19. In a self-aligning pulley, a pulley body, means for supporting it for rotation, and a plurality of pulley-engaging elements moveably mounted on said body and adapted to be interposed between said body and a belt passing thereabout, said moveable elements being longitudinally moveable along said pulley body, and means moveable with said body, for giving said pulley-engaging elements longitudinal movement, said last-mentioned means comprising wedge members pivotally supported on said body, and links joining said wedges with said pulley-engaging elements, each of said wedge members provided with an arcuate surface portion formed on an arc of greater diameter than the pulley proper.

RUDOLPH F. HLAVATY.